United States Patent
Liao et al.

(10) Patent No.: US 11,736,374 B2
(45) Date of Patent: Aug. 22, 2023

(54) SYSTEM AND METHOD THAT DETECT THE OCCUPIED SPACE, THE USERS WHO OCCUPY THE SPACE, AND/OR THE OCCUPIED DEVICE

(71) Applicant: Wistron Corp., New Taipei (TW)

(72) Inventors: Fang-Wen Liao, New Taipei (TW); Ping-Hung Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 168 days.

(21) Appl. No.: 16/998,105

(22) Filed: Aug. 20, 2020

(65) Prior Publication Data
US 2021/0377142 A1    Dec. 2, 2021

(30) Foreign Application Priority Data

May 27, 2020   (TW) .................................. 109117593

(51) Int. Cl.
| | | |
|---|---|---|
| *H04L 43/0817* | (2022.01) | |
| *G06F 11/32* | (2006.01) | |
| *H04L 69/12* | (2022.01) | |
| *G06F 13/12* | (2006.01) | |
| *G06F 11/30* | (2006.01) | |

(52) U.S. Cl.
CPC ...... *H04L 43/0817* (2013.01); *G06F 11/3055* (2013.01); *G06F 11/328* (2013.01); *G06F 13/126* (2013.01); *H04L 69/12* (2013.01)

(58) Field of Classification Search
CPC ..... H04L 43/0817; H04L 69/12; H04L 41/12; H04L 67/22; H04L 61/609; G06F 11/3055; G06F 11/328; G06F 13/126; G06F 11/32; G06F 11/3058; G06F 3/1423
USPC ........................................................ 709/224
See application file for complete search history.

(56) References Cited

U.S. PATENT DOCUMENTS

| | | | |
|---|---|---|---|
| 7,830,897 B1 * | 11/2010 | Tannenbaum .... | H04L 29/12254 370/437 |
| 2004/0212610 A1 * | 10/2004 | Hamlin ................. | G06F 3/1423 345/211 |
| 2015/0244822 A1 * | 8/2015 | Martini .................. | H04L 41/50 709/225 |

* cited by examiner

*Primary Examiner* — Tan Doan
(74) *Attorney, Agent, or Firm* — McClure, Qualey & Rodack, LLP

(57) ABSTRACT

An equipment detection system includes a processor, a communication module, and a display module. The processor is configured to detect a connection to an external device. The processor enumerates device information about the external device, obtains user information from a local host, and generates a data structure according to the device information and the user information. The processor is included in the local host. The communication module is configured to transmit the data structure and receive status information. The status information includes a placement space corresponding to the external device or the status of the external device. The status information is associated with the data structure. Moreover, the display module is configured to display the status information.

18 Claims, 4 Drawing Sheets

SYSTEM AND METHOD THAT DETECT THE OCCUPIED SPACE, THE USERS WHO OCCUPY THE SPACE, AND/OR THE OCCUPIED DEVICE

CROSS REFERENCE TO RELATED APPLICATIONS

This Application claims priority of Taiwan Patent Application No. 109117593, filed on May 27, 2020, the entirety of which is incorporated by reference herein.

BACKGROUND OF THE INVENTION

Field of the Invention

The present disclosure relates to a detection system and, in particular, to an equipment detection system and an equipment detection method.

Description of the Related Art

In recent years, as the combination of cloud technology and mobile device technology has become more and more perfect, employees can use cloud services to obtain data or perform online operations anywhere in the office. Some companies have introduced the concept of no fixed seats to facilitate employees' meetings or discussions. In other words, the company does not provide fixed seats to employees. Therefore, employees only need to bring their laptops to work anywhere in the building, increasing the flexibility of discussions between employees. Employees are not limited to sitting in fixed seats.

However, if the office area is large, if there are many floors, if there are many meeting rooms, if there are a lot of shared seats, or if there are partitions between the office seats, employees must search for a space one by one to find empty seats or empty meeting rooms. Or, every time an employee occupies a seat or meeting room, the employee needs to manually register on a webpage, so that other employees may know that the seat or meeting room is occupied by looking it up on the webpage. In a work environment that requires high efficiency, this method is really inconvenient.

BRIEF SUMMARY OF THE INVENTION

In accordance with one feature of the present invention, the present disclosure provides an equipment detection system that includes a processor, a communication module, and a display module. The processor is configured to detect a connection to an external device. The processor enumerates device information about the external device, obtains user information from a local host, and generates a data structure according to the device information and the user information. The processor is included in the local host. The communication module is configured to transmit the data structure and receive status information. The status information includes a placement space corresponding to the external device or the status of the external device. The status information is associated with the data structure. Moreover, the display module is configured to display the status information.

In accordance with one feature of the present invention, the present disclosure provides an equipment detection method that includes the following steps: detecting a connection to an external device, enumerating device information about the external device, obtaining user information from a local host, and generating a data structure according to the device information and the user information; transmitting the data structure, receiving status information; and displaying the status information. The status information includes a placement space corresponding to the external device or the status of the external device. The status information is associated with the data structure.

The device detection system and device detection method shown in the embodiments of the present invention can execute a monitoring program through the local host to detect the external device to which the local host is connected and obtain device information about the external device. This device information can be written into the data structure and transmitted to the server. The server can obtain device information from the data structure, and query the storage space corresponding to the device information from the correspondence table, without the need to install additional devices in a general conference room. The device detection system and device detection method of the embodiments of the present invention can be applied in the case of a large office area, many floors, many meeting rooms, or a large number of shared seats. Moreover, the device detection system and device detection method achieve the effect that the server can efficiently detect the occupied space, the users who occupy the space, and/or the occupied device.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
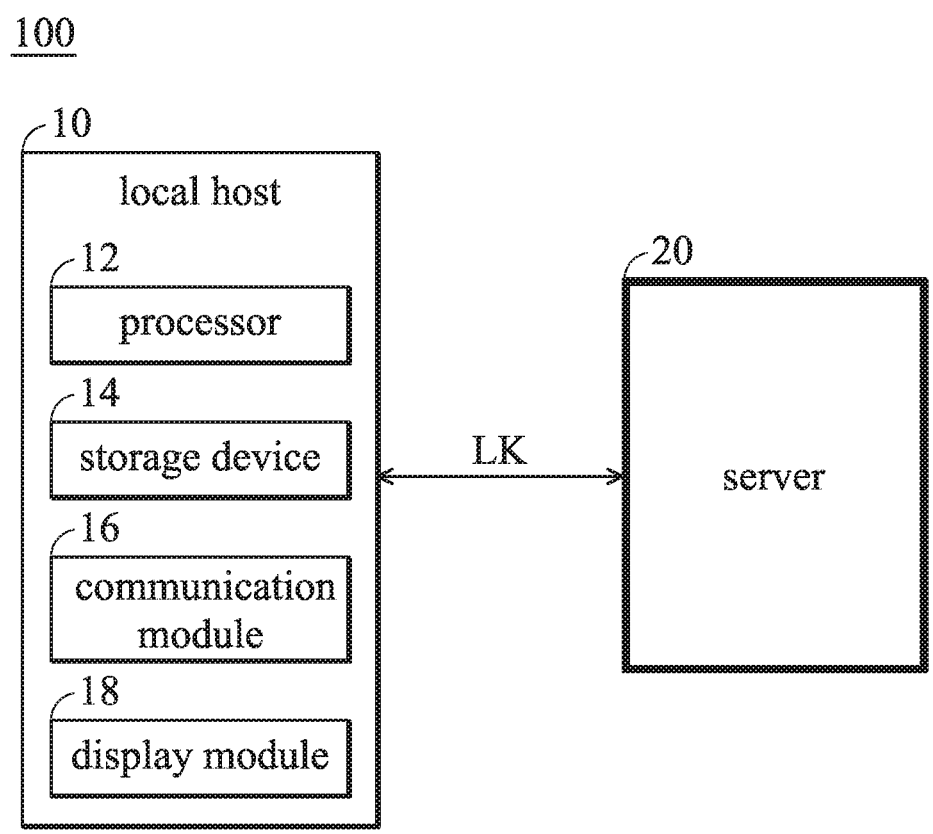
FIG. 1 is a schematic diagram of an equipment detection system in accordance with one embodiment of the present disclosure.
Figure 2:
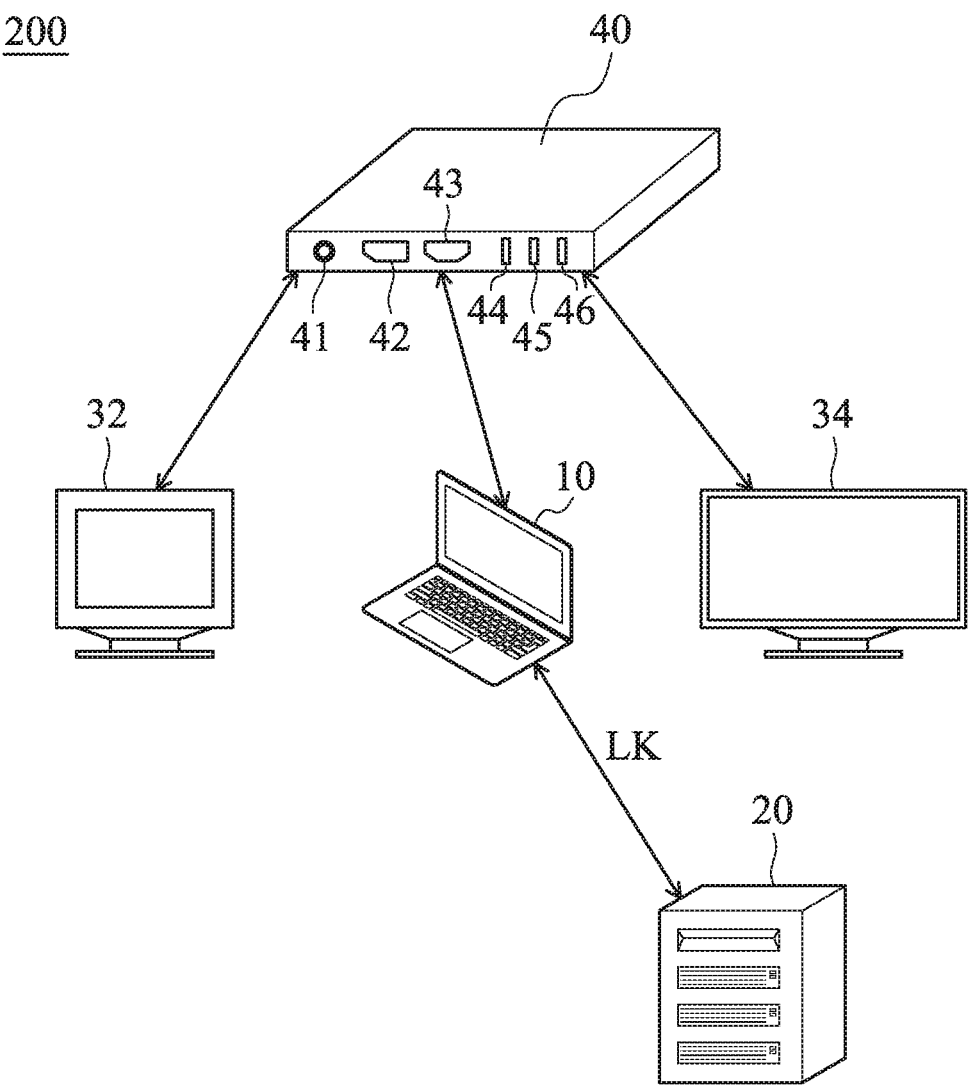
FIG. 2 is a schematic diagram of an equipment detection system in accordance with one embodiment of the present disclosure.
Figure 3:
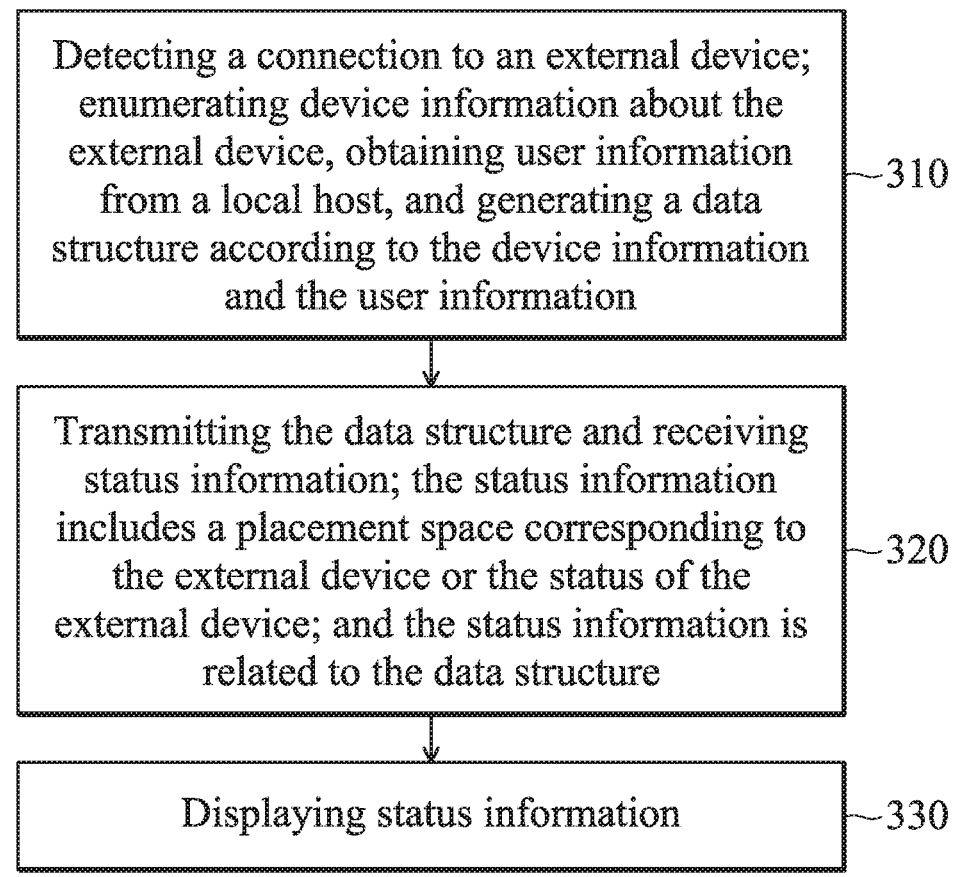
FIG. 3 is a flow chart of an equipment detection method in accordance with one embodiment of the present disclosure.

Please refer to FIGS. 1-3, FIG. 1 is a schematic diagram of an equipment detection system 100 in accordance with one embodiment of the present disclosure. FIG. 2 is a schematic diagram of an equipment detection system 200 in accordance with one embodiment of the present disclosure. FIG. 3 is a flow chart of an equipment detection method 300 in accordance with one embodiment of the present disclosure.

In one embodiment, as shown in FIG. 1, the device detection system 100 includes a processor 12, a communication module 16, and a display module 18. In one embodiment, the processor 12, the communication module 16, and the display module 18 are included in a local host 10. In one embodiment, the local host 10 further includes a storage device 14. The local host 10 is, for example, a laptop, a tablet, a mobile phone, or an electronic device with computing capability. For convenience of description, the laptop will be taken as an example for description later.

In one embodiment, the processor 12 can be implemented by integrated circuits such as micro controller, microprocessor, Digital Signal Processor (DSP), Field Programmable Gate Array (FPGA), Application Specific Integrated Circuit (ASIC) or a logic circuit.

In one embodiment, the storage device 14 can be implemented by a read-only memory, a flash memory, a floppy disk, a hard disk, a compact disk, a flash drive, a magnetic tape, a network accessible database, or a storage medium having the same function by those skilled in the art.

In one embodiment, the local host 10 establishes a communication link LK through a wired or wireless method between the communication module 16 and a server 20.

In one embodiment, the communication module 16 can be a Bluetooth module, a Wi-Fi module, a Wi-Fi sharer, an input/output port transmitted through a network cable, or other transmission device.

In one embodiment, the display module can be a display for displaying the occupation status of various devices.

The following description uses FIG. 2 as an example to illustrate the device detection method 300. In FIG. 2, the local host 10 uses a laptop as an example, and the external device uses screens 32 and 34 and a docking device 40 as an example. Those of ordinary skill in the art should understand that external devices refer to devices other than the local host 10, such as Bluetooth devices, projectors, cameras, microphones, conference room phones, etc., which can be applied to the device detection method 300 of the application. In one embodiment, the processor 12 is used to execute a monitoring program, which can be stored in the storage device 14. In one embodiment, the monitoring program is a background program.

In step 310, the processor 12 detects whether the processor 12 is connected to an external device (such as the screens 32, 34 and the docking device 40). In response to detecting the connection to the external device, the processor 12 enumerates device information about the external device, and obtains user information from a local host 10, and generates a data structure according to the device information and the user information. Moreover, the processor 12 is included in the local host 10.

In one embodiment, the processor 12 executes a monitoring program. Moreover, the monitoring program is used to detect whether the local host 10 is communicatively connected to an external device (such as the screens 32, 34 and the docking device 40).

In one embodiment, the monitoring program is installed in the local host 10 in advance. The monitoring program is a background program that is resident and executed. The monitoring program is used to detect whether the local host 10 is connected to an external device in a wired or wireless manner.

In one embodiment, when the monitoring program detects that the local host 10 is communicatively connected to an external device, step 310 is performed. When the monitoring program does not detect that the local host 10 is communicatively connected to the external device, in step 310, the monitoring program continuously detects whether the local host 10 is communicatively connected to the external device.

In one embodiment, the monitoring program can continuously poll the usage status of each slot of the local host 10, the communication device 16, and the transmission device. For example, when the monitoring program detects the usage state of signal input or output, data exchange, power input or output, communication connection, etc., it is determined whether the local host 10 is connected to an external device by a wired or wireless connection. For example, the monitoring program continuously monitors whether each Universal Serial Bus (USB) port and High Definition Multimedia Interface (HDMI) port of the local host 10 are occupied. When the monitoring program detects that the HDMI port receives a signal, it determines that the HDMI port is occupied, represents that the HDMI port of the local host 10 is connected to an external device, and further obtains the information of the external device in the subsequent steps. In one embodiment, the local host 10 can be connected to an external device (such as a screen 32) in the conference room through a communication module 16 (such as a Bluetooth device), and the monitoring program continuously monitors the connection status of the communication module 16. For example, when the monitoring program detects that the Bluetooth device is connected to the screen 32, it determines that the local host 10 is connected to the external device.

In one embodiment, the user information includes the hardware identification code and the user name of the local host 10. The processor 12 generates a data structure according to the hardware identification code, the user name, and device information.

In one embodiment, the user information includes the hardware identification code and the user name of the local host 10. The marking method of the hardware identification code is, for example, "PCName: MyThinkPad". Moreover, the marking method of the user name is, for example, "UserName: Elie". In addition, the user information may also include the IP location of the local host 10, and its representation is, for example, "IPAddress: 10.19.10.1".

In step 320, the communication module 16 transmits the data structure and receives status information, the status information includes a placement space corresponding to the external device or the status of the external device; and the status information is related to the data structure.

In one embodiment, the status information comprises the status corresponding to the external device, the hardware identification code in the data structure, the user name, the usage status of the external device, the amount of space that is occupied, a plurality of status indications on multiple screens, whether or not it is the main screen, the expansion port occupation status, a plurality of placement angles of these screens, or a docking device identification code. In one embodiment, the status information includes information about the state of the storage space and/or the external device. In one embodiment, the status information includes information about the state of the storage space and/or the external device. In one embodiment, the status information includes information about the usage status and occupied status. In one embodiment, the status information includes an occupancy status field or an occupancy status bit to indicate whether the external device is occupied. For example, when the external device (for example, the screen 32) is not occupied, the value of the occupation status field or the occupation status bit of the corresponding screen 32 is 0. When the external device (for example, the screen 32) is being used, the value of the occupation status field or the occupation status bit of the corresponding screen 32 is 1. In one embodiment, the status information includes a plurality of expansion port occupation status. The expansion port occupation state refers to a state in which each expansion port of the expansion port device is occupied. For example, in the status information, the value of the occupied status field or occupied status bit corresponding to the occupied expansion port is 1. In one embodiment, the communication module 16 transmits the data structure to the server 20, and the server 20 marks the status of the external device as a usage state or marks the placement space corresponding to the external device as occupied space based on the hardware identification code, user name, and device information in the data structure, generates status information, and transmits the status information to the local host 10. In one embodiment, the device information is screen information, and the screen information includes a screen identification code. The communication module 16 transmits the data structure to a server 20. The server 20 queries the placement space corresponding to the screen identification code from the correspondence table, and marks the placement space as occupied space or the status of the external device corresponding to the screen information is a usage state. The server 20 generates status information and transmits the status information to the local host 10.

In one embodiment, the device information is screen information, and the screen information includes multiple screen identification codes. The communication module 16 transmits the data structure to a server 20. The server 20 queries the placement space corresponding to these screen identification codes from the correspondence table, and marks the placement space as occupied space. The server 20 marks the status of the corresponding multiple screens as a usage status according to the screen identification codes, generates status information, and transmits the status information to the local host 10.

In one embodiment, the processor 12 monitors the usage status of the screens in a screen wall through the status information, the usage status of each of the screens includes whether the screen is the main screen, the screen placement angle, the screen identification code in use, or the user information.

In one embodiment, the device information is docking device information. The docking device information includes a docking device identification code, the server 20 queries the placement space corresponding to the docking device identification code from a correspondence table, and marks the placement space as occupied space, and generates the status information.

In one embodiment, the external device is a docking device 40. The device information is docking device information. The docking device information includes an expansion port occupation status. The communication module 16 transmits the data structure to the server 20. The server identifies the state of the expansion port device as a usage state according to the expansion port occupation state, and generates status information. In one embodiment, the input/output port 41 in the docking device 40 is, for example, an audio jack (which can be connected to a speaker), the input/output port 42 is, for example, a display port, and the input/output port 43 is, for example, HDMI port and the input/output ports 44 to 46 are, for example, the same or different types of USB ports. For example, if only the input/output port 41 is occupied among the input/output ports 41 to 46, the value in the occupied status field or occupied status bit corresponding to the input/output port 41 in the occupied status is 1. Moreover, the value in the occupied status field or occupied status bit corresponding to the input/output ports 42 to 46 is 0.

In one embodiment, when the monitoring program detects that the local host 10 is communicatively connected to an external device (such as the docking device 40), the monitoring program enumerates the docking device information of the docking device 40. The docking device information includes a docking device identification code. The identification method of the docking device identification code is, for example, "DockingID: ASMedia USB 3.1". In response to the monitoring program detecting that the local host 10 is communicatively connected to the docking device 40, the monitoring program registers (or records) this docking device identification code. In another embodiment, the monitoring program can also detect which ports of the docking device 40 are occupied and record them in the data structure.

In one embodiment, when the monitoring program detects that the local host 10 is communicatively connected to the docking device 40 and connects to a power supply socket (e.g., connects to a conference room power supply socket for charging), the monitoring program registers the docking device identification code and power supply socket identification code. In other words, the monitoring program registers and enumerates all the hardware identification codes that are connected to the local host 10. The enumeration means that the monitoring program obtains the hardware identification codes, hardware names, and usage status of all external devices that are communicatively connected to the local host 10.

For example, when the monitoring program detects that the local host 10 is communicatively connected to the screens 32 and 34, the monitoring program will further enumerate the device information of the screens 32 and 34, respectively. The device information is screen information. The screen information includes, for example, a screen identification code, a screen name, whether it is a main screen, a horizontal or a vertical screen, a screen width, and/or a screen height, etc. The display method of the screen identification code is, for example, "MonitorPosition [3]", the display method of the screen name is, for example, "DisplayName: Wide viewing angle & High density FlexView Display 2560*1440". Whether the screen is a main screen referring to the configuration for the local host 10, for example, "IsGDIPrimary: true" (true for yes, false for no). Moreover, the display method for horizontal or vertical display is "Orientation: 0" (0 means for horizontal, 1 means for vertical). For example, the display method of the screen width is "W: 1920", and the display method of the screen height is "H: 1080". For the local host 10, the device information can include the configuration of the number of each enumerated screen. For example, the local host 10 configures the screen on the right as screen 1, and the screen on the left as screen 2. For another example, the local host 10 configures a large screen as screen 1 and a small screen as screen 2.

Therefore, the local host 10 enumerates each connected external device, and the data structure includes information corresponding to each external device.

The above device information labeling method can be applied to generate data structures. However, those with ordinary knowledge in the art should be able to understand that the above-mentioned way of marking device information is only an example, and the implementation of the generated data structure can be adjusted according to the actual implementation.

In one embodiment, as shown in FIG. 2, due to the light weight of the local host 10, the related input/output ports are simplified. Moreover, only the interfaces of C-type USB port, USB3.0 port or Thunderbolt (a type of connector standard) port is provided for extending all input/output ports. The local host 10 can be connected to the docking device 40 through these ports to expand the number of input/output ports. For example, the docking device 40 can provide various forms of input/output ports 41 to 46. The input/output port 41 is, for example, an audio port; the input/output port 42 is, for example, a display port; the input/output port 43 is, for example, an HDMI port, and input/output ports 44-46 are, for example, the same or different types of USB ports. Those of ordinary skill in the art should understand that the input/output ports 41-46 of the docking device 40 are not limited to these examples, and FIG. 2 is only an embodiment.

For example, when the local host 10 is connected to the docking device 40 and the docking device 40 is connected to the screens 32 and 34, the local host 10 can communicate with the screens 32 and 34 through the docking device 40 to make the screens 32 and 34 become an external screen of the local host 10. The local host 10 executes a monitoring program. The monitoring program obtains the device information of the docking device 40, the screens 32 and 34, and reads the user information of the local host 10.

In one embodiment, the monitoring program generates a data structure based on device information and user information. In one embodiment, the monitoring program generates a data structure according to the hardware identification code, the user name, and the device information.

Taking FIG. 2 as an example, the monitoring program generates a data structure based on the device information of the docking device 40, the screens 32 and 34, and the user information of the local host 10. In other words, the monitoring program writes (adds or inserts) the content such as device information of the docking device 40, screens 32 and 34, and user information of the local host 10 into a segment of code to generate a data structure.

In one embodiment, the data structure is in a dynamic format. When the monitoring program detects a change in the external device, for example, the screen 32 is disconnected from the docking device 40, the monitoring program can enumerate the current external device again and update the data structure. In the updated data structure, only the content of the docking device 40, the device information of the screen 34, and the user information of the local host 10 are included.

In one embodiment, the monitoring program can use JavaScript Object Notation (JSON) to present the data structure as a standard format of JavaScript objects. JSON can be used for data presentation and transmission on the website (for example, data transmission between the server 20 and the local host 10). JSON can add the same basic data types, such as strings, numbers, arrays, Boolean values (such as device information, user information). In this way, the monitoring program can transmit the data structure converted by JSON to the server 20 through the communication link LK.

In step 330, the display module 18 displays status information.

The server 20 is used to obtain a data structure, obtain device information from the data structure, and query a storage space corresponding to the device information from a correspondence table.

Figure 4:
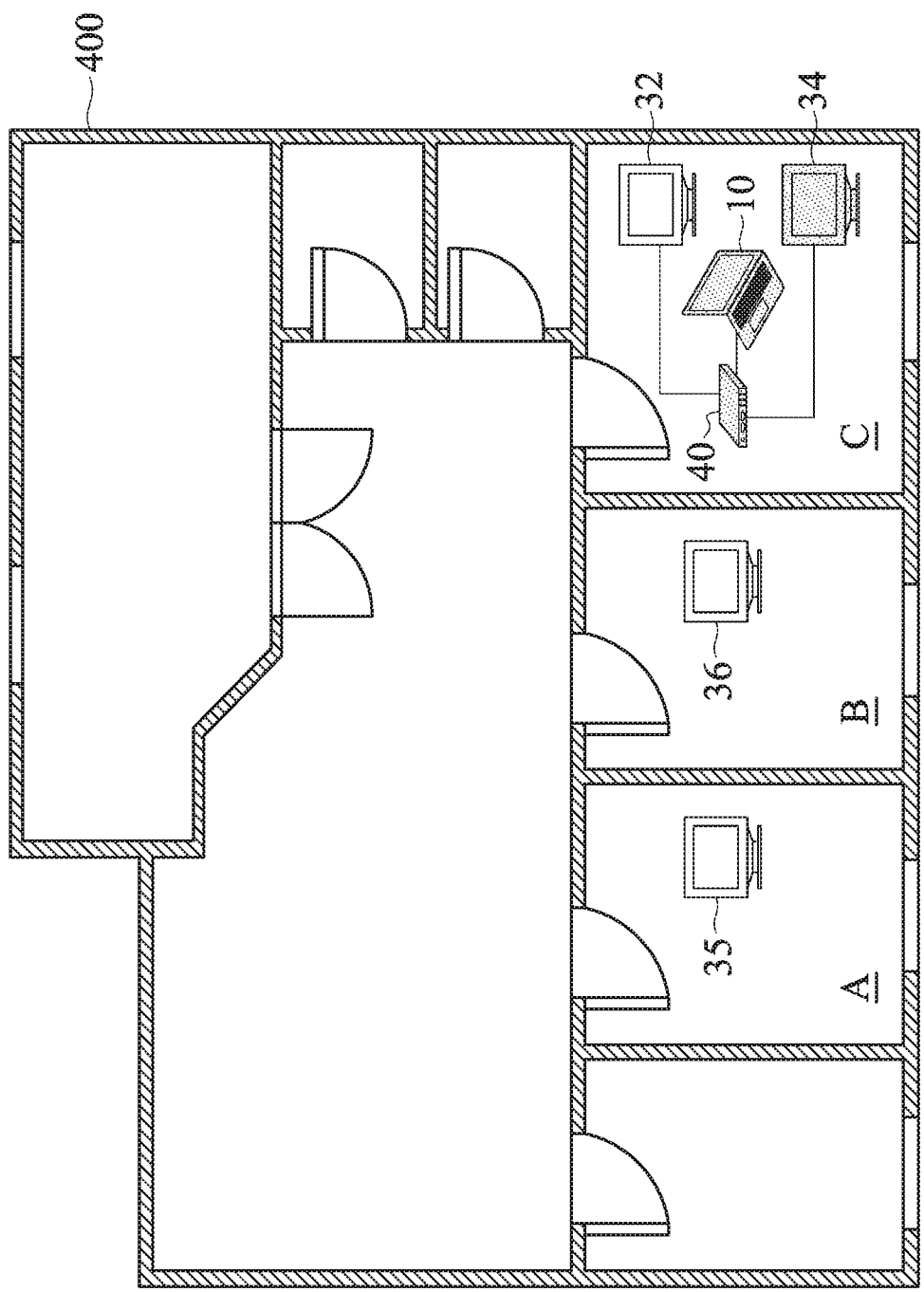
FIG. 4 is a schematic diagram of a space plane in accordance with one embodiment of the present disclosure.

In one embodiment, as shown in FIG. 4, FIG. 4 is a schematic diagram of a space plane 400 in accordance with one embodiment of the present disclosure. In one embodiment, the placement space is a meeting room, a seat, or a shared office area. Since each external device is fixedly placed in a specific space, for example, the screen 35 is fixed in the conference room A (as shown in FIG. 4), the screen 36 is fixed in the conference room B, and the docking device 40, screens 32 and 34 are fixed in the conference room C. The space plane 400 of FIG. 4 can be stored in the server 20 in advance, and can be displayed in the display module 18.

In one embodiment, the device information about the external devices placed in each conference room can be recorded in advance using a correspondence table. In other words, the correspondence table can be generated in advance and stored in the server 20. The correspondence table records the external devices (e.g., the conference room C includes the screen 34) and device information about each of the external devices (e.g., the screen identification code of screen 34) included in each conference room (e.g., conference room C). Therefore, the corresponding external device (e.g., screen 34) can be found through the device information (e.g., screen identification code). Moreover, the conference room (e.g., conference room C) where the external device (e.g., screen 34) is placed can be found.

In an embodiment, when the server 20 inquires that the placement space corresponding to the device information is the conference room C, the server 20 can determine and mark that the conference room C is currently occupied. Furthermore, the docking device 40, the screen 34, and the local host 10 being used in the conference room C can be further marked with colors or symbols (shown by diagonal lines in FIG. 4). In some embodiments, the server 20 can present the space plane 400 in the form of a webpage, and the local host of other users can access the status information provided by the server 20. For example, the status information can be presented through a webpage, and the space plane 400 is displayed through the display module 18. It is known from the space plane 400 that the conference room C is currently occupied, saving time for other users to find available conference rooms.

In one embodiment, the webpage provided by the server 20 can further display at least a part of user information (e.g., user name) of the local host 10 and/or device information (e.g., screen name). In this example, other users can click on the local host 10 or an external device displayed on the web page to know the user name and/or the screen name being used in the conference room A.

It can be seen that, since the server 20 obtains device information and user information from the data structure, it can selectively (or according to default settings) provide device information and user information to other users for access. For example, when the server 20 generates status information, the device information and user information provided by the local host 10 and the electronic devices of other users are written into the status information, so that other users can access multiple device information and user information after receiving the status information. For example, other users can click on the screen 34 in the web page provided by the server 20 to know the configuration of the local host 10 on the screen, for example, the screen 34 is configured as the main screen by the local host 10.

In one embodiment, the device information obtained by the server 20 is docking device information. The docking device information includes at least the docking device identification code. The server 20 queries the placement space corresponding to the docking device identification code from the correspondence table, and marks the placement space as occupied space.

In one embodiment, the docking device information includes docking device occupation information. The user can click on the docking device 40 in the webpage provided by the server 20 to know which docking devices are occupied. For example, the expansion ports 41 to 46 of docking device 40 are displayed on the webpage, and expansion port 41, expansion port 43, and expansion port 46 are currently occupied. Moreover, the user information of the occupied expansion port 41, expansion port 43, and expansion port 46 are displayed through the web page. In addition, the expansion ports 41-46 can be various forms of input/output ports 41-46.

In one embodiment, the hardware identification code, docking device identification code, screen identification code, and/or other external device identification codes can be applied to generate a universally unique identifier (UUID), so that all the local hosts 10 and external devices (such as the screens 32, 34 and the docking device 40) registered with the server 20 are respectively bound to a universal unique identification code.

In one embodiment, the server 20 knows the usage status of the external device according to the device information in the data structure. For example, the input/output port 43 of the docking device 40 is being occupied by the screen 34, and the server 20 marks the usage status of the docking device 40 and the screen 34 as being in use. In addition, the local host 10 transmits image information to the screen 34 through the input/output port 43 of the docking device 40, so that the screen 34 displays an image according to the image information.

In one embodiment, the server 20 searches the correspondence table for the placement space of the corresponding screen identification code, and marks the placement space as occupied space. In this example, the device information obtained by the server 20 is screen information. Moreover, the screen information includes multiple screen identification codes. The server 20 marks the respective usage status of the screen identification codes as being in use, so as to monitor the respective usage status of a plurality of screens in a screen wall. More specifically, the screen wall can be formed by arranging multiple screens, and some or all of these screens may be selectively turned on and displayed. The server 20 can be further applied according to the screen identification code. For example, the server 20 continuously receives the screen identification code corresponding to the right half of the screen in the screen wall. When the server 20 counts a count time of the status in an in-use state of a specific screen of a screen wall, determined whether the in-use state of the specific screen is greater than a time threshold or a usage amount of the specific screen is greater than an amount threshold is greater than a times threshold, then the server 20 outputs information indicating that the right half of the screen on the screen wall has a higher probability of damage.

The device detection system and device detection method shown in the embodiments of the present invention can execute a monitoring program through the local host to detect the external device to which the local host is connected and obtain device information about the external device. This device information can be written into the data structure and transmitted to the server. The server can obtain device information from the data structure, and query the storage space corresponding to the device information from the correspondence table, without the need to install additional devices in a general conference room. The device detection system and device detection method of the embodiments of the present invention can be applied in the case of a large office area, many floors, many meeting rooms, or a large number of shared seats. Moreover, the device detection system and device detection method achieve the effect that the server can efficiently detect the occupied space, the users who occupy the space, and/or the occupied device.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An equipment detection method, comprising:
   detecting a connection to an external device; enumerating device information about the external device, obtaining user information from a local host, and generating a data structure according to the device information and the user information;
   transmitting the data structure and receiving status information; wherein the status information includes a placement space corresponding to the external device or status of the external device; wherein the status information is associated with the data structure; and
   displaying the status information;
   wherein the device information related to the external device placed in the placement space is recorded in advance using a correspondence table;
   wherein the placement space is a meeting room or a shared office area;
   wherein the user information includes a hardware identification code and a user name of the local host, the equipment detection method further comprising:
   generating the data structure according to the hardware identification code, the user name and the device information, and the local host transmits the data structure to a server; according to the hardware identification code, the user name, and the device information in the data structure, the server marks the status of the external device as an in-use state or marks the placement space corresponding to the external device as occupied space, and generates the status information.

2. The equipment detection method of claim 1, further comprising:
using the server to obtain the data structure, querying the placement space corresponding to the device information in the data structure from the correspondence table, marking the placement space or the status of the external device according to the data structure, and generating the status information.

3. The equipment detection method of claim 1, wherein the device information is screen information, the screen information includes a screen identification code, and the equipment detection method further comprises:
transmitting the data structure to the server; wherein the server queries the placement space corresponding to the screen identification code from the correspondence table, and marks the placement space as occupied space or marks the status of the external device corresponding to the screen information as the in-use state, and generates the status information.

4. The equipment detection method of claim 1, wherein the device information is screen information, and the screen information includes a plurality of screen identification codes, the equipment detection method further comprising:
transmitting the data structure to the server; wherein the server queries the placement space corresponding to the plurality of screen identification codes from the correspondence table, and marks the placement space as occupied space, the server marks the status of corresponding multiple screens as a usage status according to the plurality of screen identification codes, and generates the status information.

5. The equipment detection method of claim 4, further comprising:
monitoring the usage status of the screens in a screen wall through the status information; wherein the usage status of each of the screens comprises whether the screen is the main screen, the screen placement angle, the screen identification code in use, or the user information.

6. The equipment detection method of claim 1, wherein the device information is docking device information, the docking device information comprises a docking device identification code, the equipment detection method further comprising:
transmitting the data structure to the server; wherein the server queries the placement space corresponding to the docking device identification code from the correspondence table, and marks the placement space as occupied space, and generates the status information.

7. The equipment detection method of claim 1, wherein the external device is a docking device, the device information is docking device information, the docking device information comprises an expansion port occupation status, the equipment detection method further comprising:
transmitting the data structure to the server; wherein the server marks the state of the docking device as the in-use state according to the expansion port occupation status, and generates the status information.

8. The equipment detection method of claim 1, wherein the status information comprises the status corresponding to the external device, hardware identification code in the data structure, user name, usage status of the external device, occupied space, a plurality of status indications on multiple screens, whether or not it is the main screen, expansion port occupation status, a plurality of placement angles for these screens, or a docking device identification code.

9. The equipment detection method of claim 1, wherein the server obtains the data structure, counts a count time of the status in the in-use state of a specific screen of a screen wall, the equipment detection method further comprising:
determining whether the in-use state of the specific screen is greater than a time threshold or a usage amount of the specific screen is greater than an amount threshold, then outputting information that the specific screen has a higher probability of damage.

10. An equipment detection system, comprising:
a processor, configured to detect a connection to an external device; the processor enumerates device information about the external device, obtains user information from a local host, and generates a data structure according to the device information and the user information; wherein the processor is included in the local host;
a communication module, configured to transmit the data structure and receive status information; wherein the status information includes a placement space corresponding to the external device or status of the external device; wherein the status information is associated with the data structure; and
a display module, configured to display the status information;
wherein the device information related to the external device placed in the placement space is recorded in advance using a correspondence table;
wherein the placement space is a meeting room or a shared office area;
wherein the user information includes a hardware identification code and a user name of the local host, the processor generates the data structure according to the hardware identification code, the user name and the device information, and the communication module transmits the data structure to a server; according to the hardware identification code, the user name and the device information in the data structure, the server marks the status of the external device as an in-use state or marks the placement space corresponding to the external device as occupied space, and generates the status information.

11. The equipment detection system of claim 10, further comprising:
the server, configured to obtain the data structure, query the placement space corresponding to the device information in the data structure from the correspondence table, mark the placement space or the status of the external device according to the data structure, and generate the status information.

12. The equipment detection system of claim 10, wherein the device information is screen information, the screen information includes a screen identification code, the communication module transmits the data structure to the server, the server queries the placement space corresponding to the screen identification code from the correspondence table, and marks the placement space as occupied space or marks the status of the external device corresponding to the screen information as the in-use state, and generates the status information.

13. The equipment detection system of claim 10, wherein the device information is screen information, and the screen information includes a plurality of screen identification codes, the communication module transmits the data structure to the server, the server queries the placement space corresponding to the plurality of screen identification codes from the correspondence table, and marks the placement space as occupied space, the server marks the status of corresponding multiple screens as a usage status according to the plurality of screen identification codes, and generates the status information.

14. The equipment detection system of claim 13, wherein the processor monitors the usage status of the screens in a screen wall through the status information, the usage status of each of the screens comprises whether the screen is the main screen, a screen placement angle, a screen identification code in use, or the user information.

15. The equipment detection system of claim 10, wherein the device information is docking device information, the docking device information comprises a docking device identification code, the communication module transmits the data structure to the server, the server queries the placement space corresponding to the docking device identification code from the correspondence table, and marks the placement space as occupied space, and generates the status information.

16. The equipment detection system of claim 10, wherein the external device is a docking device, the device information is docking device information, the docking device information comprises an expansion port occupation status, the communication module transmits the data structure to the server, the server marks the state of the docking device as the in-use state according to the expansion port occupation status, and generates the status information.

17. The equipment detection system of claim 1, wherein the status information comprises the status corresponding to the external device, hardware identification code in the data structure, user name, usage status of the external device, occupied space, a plurality of status indications on multiple screens, whether or not it is the main screen, an expansion port occupation status, a plurality of placement angles of these screens, or a docking device identification code.

18. The equipment detection system of claim 1, wherein the server is configured to obtain the data structure, count time of the status in the in-use state of a specific screen of a screen wall, determine whether the in-use state of the specific screen is greater than a time threshold or a usage amount of the specific screen is greater than an amount threshold, then output information that the specific screen has a higher probability of damage.

* * * * *